United States Patent
Haumont et al.

(10) Patent No.: US 6,955,918 B2
(45) Date of Patent: Oct. 18, 2005

(54) SERVING NETWORK ENTITY RELOCATION

(75) Inventors: Serge Haumont, Helsinki (FI); Paul Sitch, Espoo (FI)

(73) Assignee: Nokia Corporation, Espoo (FI)

(*) Notice: Subject to any disclaimer, the term of this patent is extended or adjusted under 35 U.S.C. 154(b) by 344 days.

(21) Appl. No.: 10/203,665

(22) PCT Filed: Feb. 9, 2001

(86) PCT No.: PCT/FI01/00120
§ 371 (c)(1),
(2), (4) Date: Aug. 9, 2002

(87) PCT Pub. No.: WO01/60084
PCT Pub. Date: Aug. 16, 2001

(65) Prior Publication Data
US 2003/0013446 A1 Jan. 16, 2003

(30) Foreign Application Priority Data
Feb. 11, 2000 (FI) .............................................. 20000291

(51) Int. Cl.[7] ................................................ H04Q 7/20
(52) U.S. Cl. ...................... 435/436; 455/436; 455/437; 370/331
(58) Field of Search ........................... 455/432.1, 435.2, 455/436–439, 442–444; 370/328, 329, 331–334

(56) References Cited

U.S. PATENT DOCUMENTS 6,708,031 B2 * 3/2004 Purnadi et al. ............. 455/436
6,721,565 B1 * 4/2004 Ejzak et al. ................ 455/436
6,745,032 B1 * 6/2004 Alvesalo et al. ............ 455/436
2002/0072363 A1 * 6/2002 Riihinen et al ............. 455/432

FOREIGN PATENT DOCUMENTS

| WO | 9945736 | 9/1999 | |
| WO | 9955110 | 10/1999 | |
| WO | 9957935 | 11/1999 | |
| WO | WO99-6740 | * 12/1999 | ............ H04Q/7/00 |
| WO | 9966740 | 12/1999 | |
| WO | 0067499 | 11/2000 | |
| WO | 0101718 | 1/2001 | |
| WO | 0103454 | 1/2001 | |
| WO | 0130107 | 4/2001 | |

* cited by examiner

Primary Examiner—Stephen D'Agosta (57) ABSTRACT

A method (400) for relocating a serving network entity is presented. Before the relocation certain packet data information is transmitted between a terminal and a first network entity (901) at least via a second network entity (902) and via a third network entity (903). The first network entity (901) is connected to the second network entity (902) with a first path (911) and to a third network entity (903) with a second path (912), and the second network entity, which is before the relocation acting as the serving network entity, is connected to the third network entity, which is its peer network entity and after relocation acting as the serving network entity, with a third path (913). The first, second and third paths are separate paths. After the relocation said information is transmitted via the third network entity. The method is characterized in that the need for relocation of the serving network entity is communicated (403, 601) to the third network entity by the peer second network entity using the third path.

25 Claims, 8 Drawing Sheets

SERVING NETWORK ENTITY RELOCATION

CROSS-REFERENCE TO RELATED APPLICATIONS

This International Application PCT/FI01/00120 filed Feb. 9, 2001 claims priority from Finnish Application 20000291, filed Feb. 11, 2000.

BACKGROUND OF THE INVENTION

1. Technical Field

The invention relates in general to cellular networks that support transmission of packet data. In particular the invention relates to performing a serving network entity relocation from a certain network entity to a peer network entity.

2. Discussion of Related Art

Traditionally cellular systems, for example the Global System for Mobile telecommunications (GSM), have been used to transmit speech and they have implemented circuit switching. In circuit switching a certain amount of transmission resources is reserved in all the networks through which the connection goes. For new data applications there is usually need to transmit bursts of data every now and then. For this kind of data transmission circuit switching is not an efficient way to transmit data.

In the Universal Mobile Telecommunication System (UMTS) both packet switching and circuit switching are supported. When a mobile station, or a user equipment as the portable terminal communicating with the UMTS system is usually called, is changing its position, the network elements through which its packet switched data or circuit switched connections change. The UMTS system keeps track on the position of the user equipment, and the circuit switched connections are re-routed in a similar manner as in GSM, for example, and the packet switched data is re-routed similarly as in General Packet Radio Service (GPRS).

In the core UMTS network the packet switched data and the circuit switched connections may be transmitted using separate networks. The core network of UMTS transmitting the packet data may be, for example, and Internet Protocol (IP) based network. The user equipment is attached to the core UMTS network through a radio access network (RAN). Both the packet switched data and the circuit switched connections flow through the same radio access network.

Figure 1:
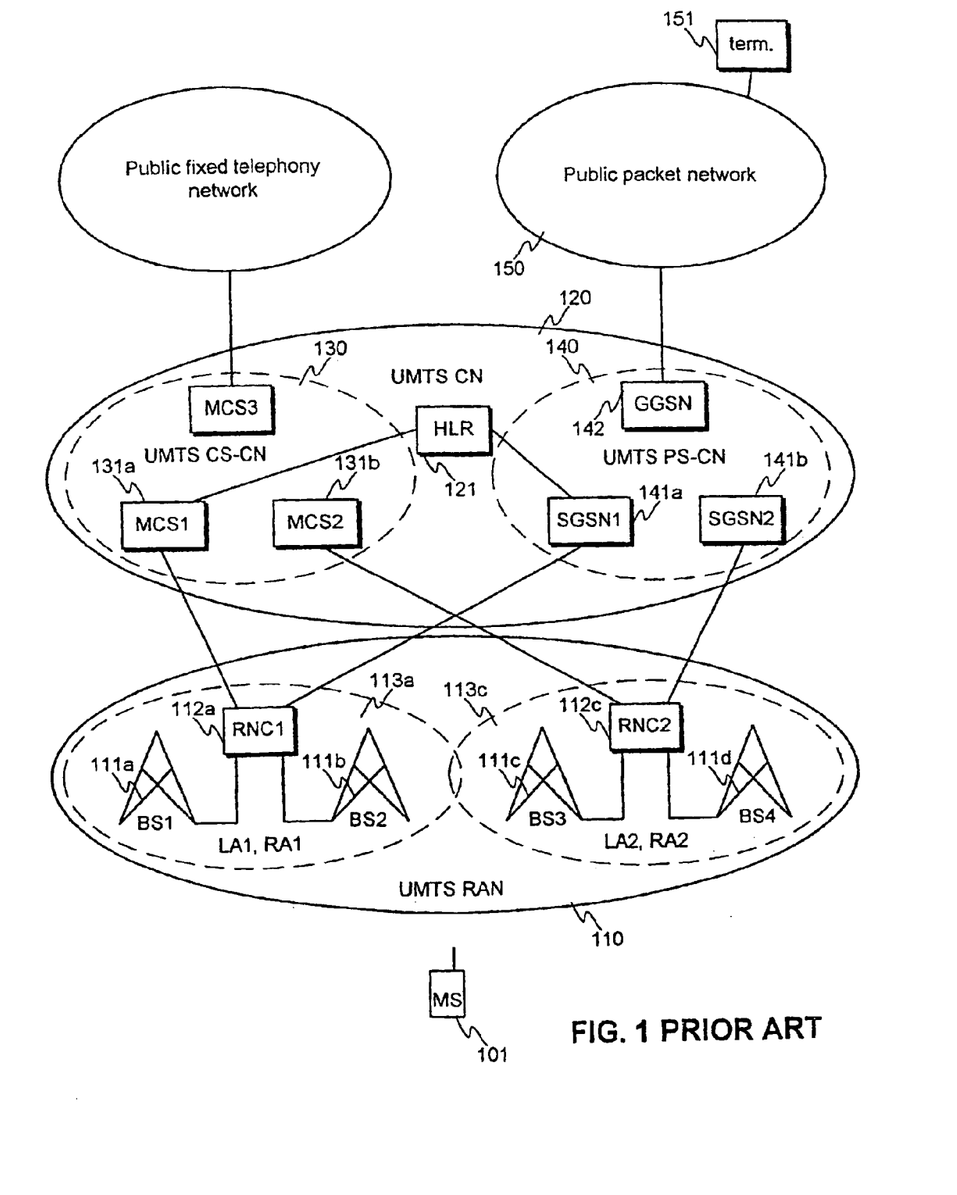
FIG. 1 illustrates an example of a UMTS core network and radio access network.

FIG. 1 presents a schematic diagram of a UMTS radio access network (RAN) 110 and UMTS core network 120. In FIG. 1 the UMTS core network 120, as one example of realizing the UMTS core network, comprises two separate core networks: the circuit switched core network (CS-CN) 130 and the packet switched core network (PS-CN) 140. The CS-CN 130 is very similar to GSM core network and comprises mobile services switching centers (MSCs), through which circuit-switched connections run. FIG. 1 presents MSCs 131a and 131b. In the common part of the UMTS core network 120 there is a data base, Home Location Register (HLR) 121, where information about the mobile stations is stored. The PS-CN comprises GPRS Supporting Nodes (GSNs) which act as routers with additional mobility functions. The data packets run through the GSNs. The GSNs facing the UMTS RAN 110 are Serving GPRS Supporting Nodes (SGSN). The SGSN is at the same hierarchical level as the MSC; it, for example, keeps track of the individual MSs' location and performs security functions and access control. The GSNs facing other packet data networks are Gateway GPRS Supporting Nodes (GGSN).

FIG. 1 presents two SGSNs 141a, 141b, and one GGSN 142 which faces a packet data network 150. The packet data networks to which UMTS core network is connected through a GGSN may be, for example, the Internet or a X.25 data network.

FIG. 1 shows base stations (BTS) 111a, 111b, 111c, 111d of the UMTS RAN 110. A mobile station communicates with these base stations over the radio interface. One or more base stations are connected to a radio network controller (RNC). The RNCs face the UMTS core network and they are connected to MSCs and/or SGSNs. It is possible to connect to each MSC or SGSN many RNCs. The RNC is responsible, for example, for allocation of radio resources and for handling handovers, where a mobile station changes cell. FIG. 1 shows two RNCs 112a, 112c.

Here, the term cell is used to refer to the area covered either by a base station or, if a base station comprises many transmitters, by one or more transmitters. A group of cells, whose base stations are connected to a part of, one or more RNC form a Location Area (LA), which term is used in connection with circuit switched connections, or a Routing Area (RA), which term is used in connection with packet switched data. FIG. 1 present two Location/Routing areas 113a and 113c.

A mobile station performs a UMTS PS attach procedure in order to obtain packet data services, in other words to inform to the UMTS system that it can send and/or received packet data. The UMTS PS attach establishes a logical link between the MS and the SGSN, and makes the MS available for, for example, paging via SGSN and notification of incoming packet data. When it actually has packet data to transmit, it performs a Packet Data Protocol (PDP) context activation.

Consider, as an example, a data packet flow between MS 101 and a terminal 151 in FIG. 1. The route of the data is MS 101-BS2 111b-RNC1 112a-SGSN1 141a-GGSN 142-packet data network 150-terminal 151. The PDP context activation has established a tunnel between the SGSN1 141a and the GGSN 142. Data between SGSN and GGSN is transmitted using a GPRS tunneling protocol (GTP), which typically runs on IP. Signaling takes place using the same protocol. Between the SGSN and the RNC data is transmitted using the same GTP protocol and there is also a tunnel. The Tunnel Endpoint Identifier (TEID) indicates the data packet belonging to a certain data packet flow related to a certain MS. Each packet transmitted towards a SGSN, GGSN, or RNC carries a SGSN, GGSN or RNC TEID, correspondingly. In the RAN, the data packets are transmitted between the RNC and the MS typically based on the International Mobile Subscriber Identifier (IMSI) of the mobile station or on a Radio Network Temporary Identity (RNTI) and according to the negotiated QoS (Quality of Service) parameters.

A mobile station may be either in a PMM (Packet Mobility Management) connected or PMM idle state. In a PMM connected state the mobile station is known by an RNC and it has a RRC connection. The RNC tracks the location of the mobile station, when the mobile station is in the PMM connected state. When the mobile station is in a PMM idle state, its location is tracked by a SGSN. The SGSN tracks the location of a mobile station only at the Routing Area level, whereas a RNC knows the cell in which a mobile station is.

Figure 2:
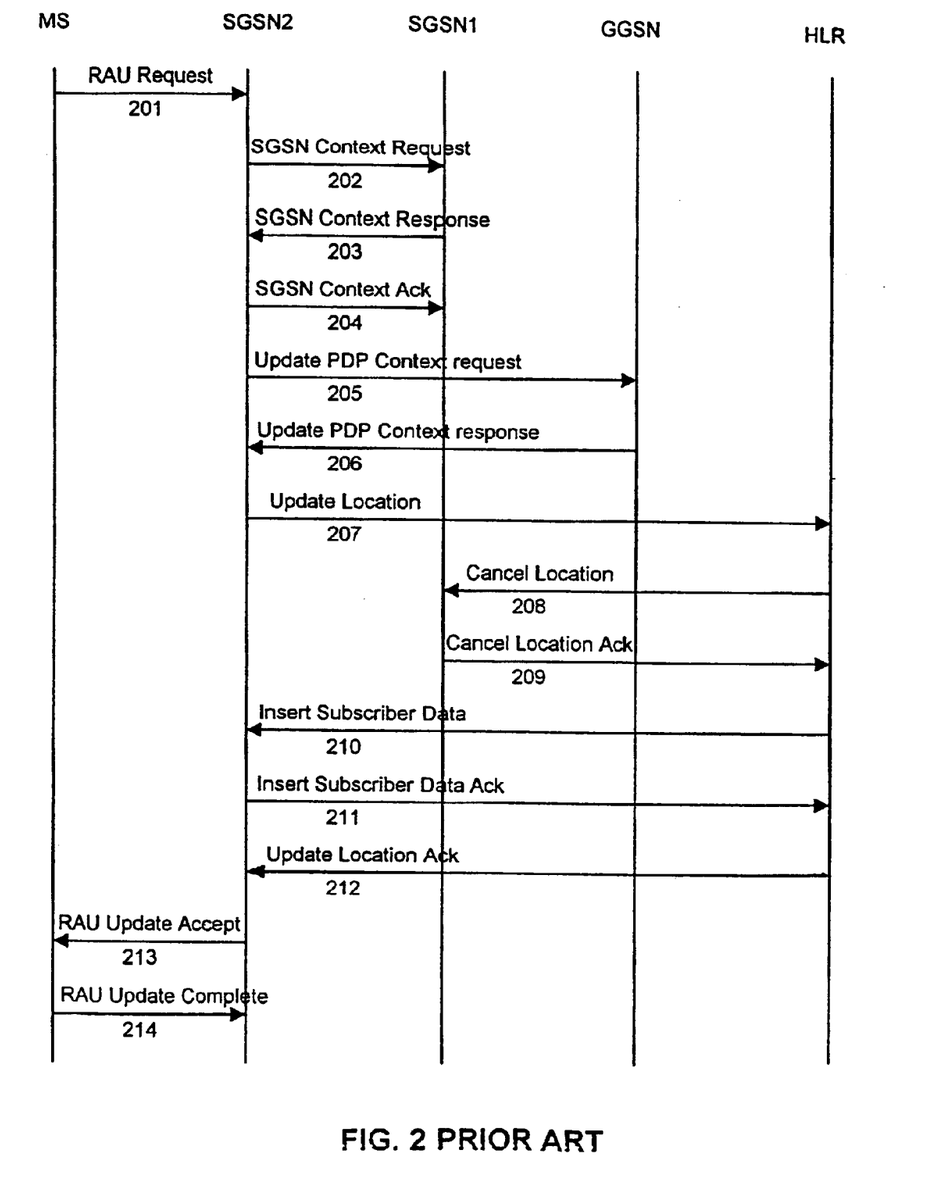
FIG. 2 illustrates a message sequence chart of a routing area update.

When a mobile station changes location, it may change cell. Usually the cell is selected based on the strength of the downlink radio transmissions. If the source (original) cell and the target cell do not belong to the same routing area, a PS-attached mobile station performs a routing area update. Consider as an example in FIG. 1 a situation, where the mobile station (which is in a PMM Idle state) changes the cell from the BS2 111a to the BS3 111c. FIG. 2 presents an example of a message sequence chart of a inter-SGSN routing area update, where the target SGSN is not the source SGSN, e.g. the target SGSN is SGSN2 and the source SGSN is SGSN1 in FIG. 1. The routing area update procedure begins with a Routing Area Update Request 201 sent by the MS to the target SGSN, to which the target RNC is connected. The target SGSN sends a SGSN Context Request 202 to the source SGSN. This message indicates the PTMSI or IMSI of the MS, the target Routing Area identifier (RAI) and some security information. Once the MS has been authenticated, the source SGSN which responds with a SGSN Context Response 203. This messages carries, for example, information about the IMSI of the MS and about the PDP contexts of the MS. After the SGSN Context Response, the target SGSN may trigger the RAN to perform some security functions with the MS. Thereafter, if the MS is authenticated properly, the target SGSN sends a SGSN Context Acknowledgement 204 to the source SGSN.

The target SGSN sends Update PDP Context Request 205 to the proper GGSN or GGSNs. This message indicates, for example, the address of the target SGSN Address, a SGSN Tunnel Endpoint Identifier and a GGSN Tunnel Endpoint Identifier. The GGSN Tunnel Endpoint Identifier is used by the GGSN to identify the PDP context. The GGSNs update their PDP context fields and return an Update PDP Context Response 206 to the target SGSN. Thereafter the target SGSN informs the HLR of the change of SGSN by sending Update Location message 207 indicating the target SGSN and the IMSI of the MS.

Cancel Location and Cancel Location Ack messages 208 and 209 between the HLR and the source SGSN inform the source SGSN that it can delete information about the MS. Insert Subscriber Data message 210 is sent by the HLR to the target SGSN and it carries subscriber information related to the MS. The target SGSN confirms by sending Insert Subscriber Data Ack message 211. Thereafter the HLR sends an Update Location Ack message 212 to the target SGSN. Thereafter the target SGSN sends a Routing Area Update Accept message 213 to the MS, and the MS responds with a Routing Area Update Complete message 214. If the routing area update is an intra-SGSN, then only messages 201, 213 and 214 are sent.

A mobile station may communicate with more than one cell at the same time. If the cells are controlled by more than one RNC, one of the RNCs is the Serving RNC (SRNC). The serving RNC is responsible, for example, for the control of the radio resources and for the control of the uplink and downlink packets. The other RNCs are usually called drift RNCs and they typically just relay data packets between the MS and the Serving RNC. In FIG. 1, for example, the mobile station may be communicating with base stations BS2 111b and BS3 111c, and the serving RNC may be the RNC1 112a. When the mobile station, for example, moves farther away from the base station BS2 111b, the relocation of the Serving RNC becomes relevant because the MS may communicate only with the base station BS3 111c. The route of packet data between the GGSN and the MS may be, for example, before the SRNC relocation GGSN-SGSN1-RNC1-RNC2-BS2-MS.

Figure 3:
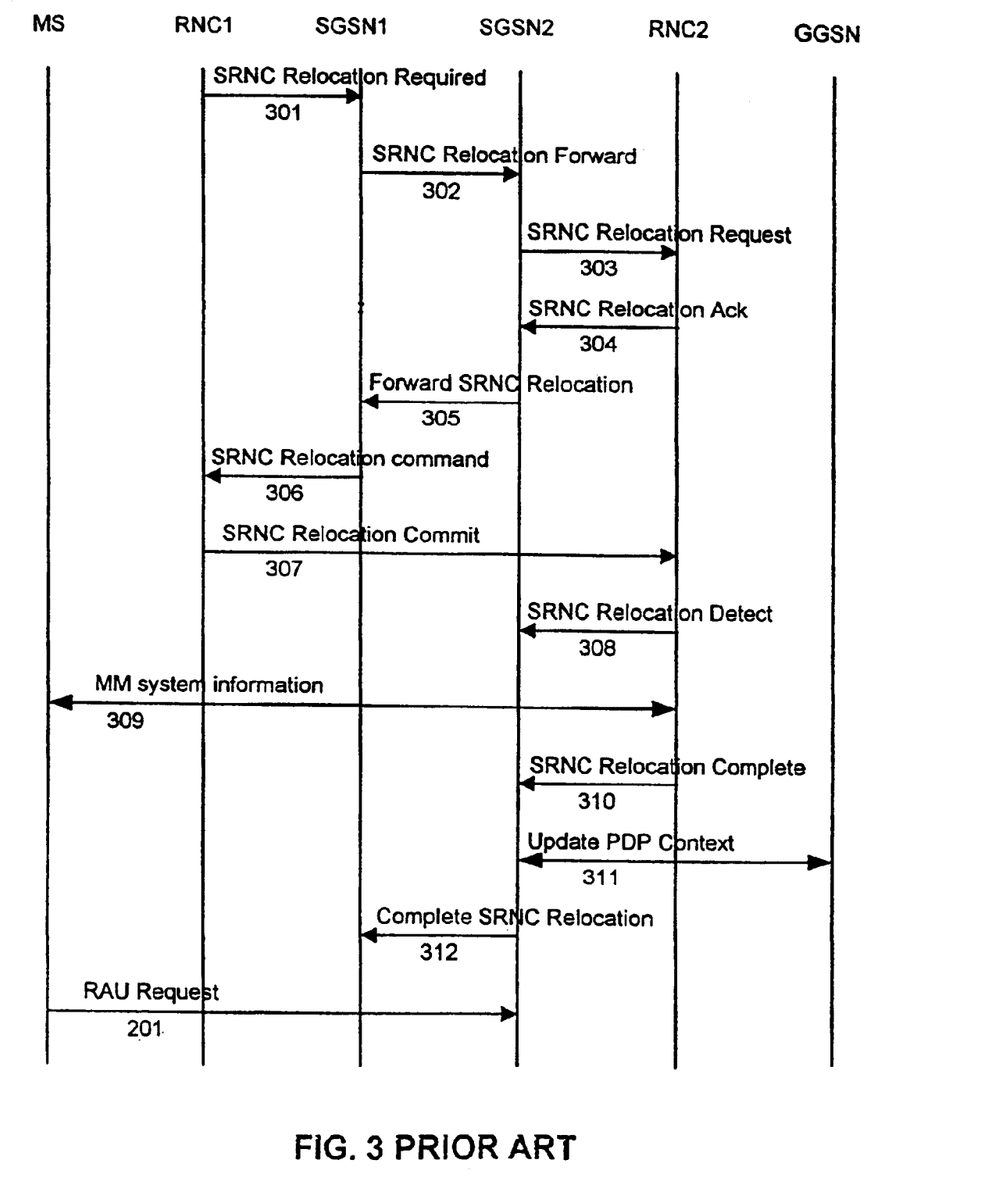
FIG. 3 illustrates a message sequence chart of a serving radio network controller relocation.

When the mobile station is in a PMM connected state, an SRNC relocation procedure is always performed before RAU (routing area update) procedure. FIG. 3 presents a message sequence chart of the steps of the relocation of a Serving RNC before the routing area update (RAU) procedure. The source RNC sends a SRNC Relocation Required message 301 indicating the target RNC and carrying an information field to be passed to the target RNC to the source SGSN. If the SRNC relocation is an inter-SGSN SRNC relocation, the source SRNS sends a Forward SRNC Relocation message 302 to the target SGSN. Thereafter the target SGSN sends a SRNC Relocation Request message 303, which carries the information field originally sent in the SRNC Relocation Required message 301, to the target RNC. The target RNC and the target SGSN establish necessary bearers to the user data between themselves (i.e. over the Iu interface). Thereafter the target RNC sends a SNRC Relocation Ack message 304 to the target SGSN. This message indicates the RNC IP address(es) (possibly one address per PDP context) on which the target RNC is willing to receive packet data and Tunnel End Point Identifier(s) which are the identifiers to be used in GTP level when sending packets to this RNC.

When the traffic resources between the target RNC and the target SGSN are allocated and the target SGSN is ready for the SRNC move, then a Forward SRNC Relocation Response message 305 is sent from the target SGSN to the source SGSN. This message indicates that the target SGSN and RCN are ready to receive from the source RNC the downstream data packets not yet acknowledged by the MS.

When the Forward SRNC Relocation Response message 305 is received in the source SGSN, the source SGSN indicates the completion of a preparation phase at the CN PS domain side for the SRNC relocation by sending the SRNC Relocation Command message 306 to the source RNC. The message comprises IP address(es), and Tunnel End Point Identifier(s) that can be used by the source RNC to send the downstream packets not yet acknowledged by the MS to the target RNC.

When the source RNC has received the SRNC Relocation command message 306, it sends a SRNC Relocation Commit message 307 to the target RNC. This Commit message indicates the GTP sequence number for the next downlink packet (SND) to be received from the GGSN, the GTP sequence number for the next uplink packet (SNU) to be tunneled to the GGSN and UP_RLC_Ack contains the acknowledgements for upstream PDU received by the source RNC on each RLC connection used by the UE. The source RNC stops the exchange of the packets with the MS, and starts tunneling the buffered and incoming downstream packets towards the target RNC using RNC IP address(es) and Tunnel End Point Identifier(s) indicated in the SRNC Relocation Command message 306.

At this point the target RNC, i.e. RNC2, starts acting as the Serving RNC. The downlink and uplink packets are transmitted between the target RNC and the MS, and the target RNC, instead of the source RNC, controls the transmission. The target RNC sends New Mobility Management System Information message 309 to the MS indicating e.g. relevant Routing Area and Location Area. The target RA identifier, which is different from the source RAI, triggers a RA Update procedure which starts by the mobile station sending Routing Area Update message 201. Before this procedure the downlink packets arrive, again referring to the example presented in FIG. 1, the following route: GGSN-SGSN1-RNC1-RNC2-BS53-MS. After the RA Update, the GGSN can send packets intended for the MS directly to the SGSN2 and the route is GGSN-SGSN2-RNC2-BS3-MS.

The uplink traffic is not stopped due to the new Mobility Management System Information or the RA Update procedure, because the target SGSN may send an uplink packet to the GGSN before the update PDP context is performed. This is because the address of the SGSN sending the uplink packet to the GGSN is not checked.

Immediately after a successful switch at the RNC, the target RNC, which is now the serving RNC, sends SRNC Relocation Detect message 308 to the SGSN2. After sending out the New MM System Information message 309, the target RNC sends an SRNC Relocation Complete message 310 to the target SGSN. The target SGSN sends an Update PDP Context Request message 311 (new SGSN Address, QoS Negotiated, SGSN Tunnel Endpoint Identifier, GGSN Tunnel Endpoint Identifier) to the GGSNs concerned. GGSN Tunnel Endpoint Identifier is used by GGSN to identify the PDP context. The GGSNs update their PDP context fields and return an Update PDP Context Response message 311 (GGSN Tunnel Endpoint Identifier). The target SGSN sends Complete Serving RNC relocation message 312 to the source SGSN when all GGSNs have been updated.

If the serving RNC relocation is an inter-SGSN SRNC relocation, there is no need for the RA update procedure which starts with the message 201. Further, the Forward SRNC Relocation messages 302 and 305, Update PDP Context messages 311 and Complete SRNC Relocation message 312 in FIG. 3 are not needed.

As can be seen in FIGS. 2 and 3, the relocation of a serving SRNC including a routing area update involves a large number of messages. If only the phase of SRNC relocation preceding the RA update is studied, there are at least 12 messages involved in the inter-SGSN SRNC relocation. In an error situation, where the source RNC, for example, does not receive the SRNC Relocation Command, the problem can be caused by the source SGSN, the target SGSN or the target RNC. Furthermore, the uplink and downlink packet transmission is usually interrupted during SRNC relocation.

DISCLOSURE OF INVENTION

The object of the invention is to present a robust and simple method for relocating a serving network entity.

The object of the invention is achieved by letting the target and source network entities to negotiate the relocation of a serving network entity between themselves.

A method according to the invention is a method for relocating a serving network entity related to a certain terminal, where before the relocation certain packet data information is transmitted between the terminal and a first network entity at least via a second network entity, which is connected to the first network entity with a first path, and via a third network entity, which is connected to the first network entity with a second path and to the second network entity, which is a peer entity of the third network entity, with a third path, which first, second and third paths are separate paths, before the relocation the second network entity is acting as the serving network entity, after the relocation said information is transmitted via the third network entity, which is acting as the serving network entity, and a need for serving network entity relocation from the second network entity to the third network entity is detected, and the need for relocation is communicated to the third network entity by the second network entity using the third path, and a routing area update procedure is triggering the relocating.

The invention relates also to a network entity, which is arranged to perform a role of a serving network entity, the network entity comprising means for sending a message indicating need for a relocation of a serving network element to a peer network entity means for receiving the message from a peer network entity, and means for triggering the relocation in accordance with a routing area update procedure.

In a method according to the invention, a relocation of a serving network entity related to a certain packet data connection is performed. The packet data connection may be, for example, a connection between a mobile station and a terminal on the other side of a public packet network. There are at least three network entities involved in the information transmission. The first network entity may be, for example, a Serving GPRS Support Node of the UMTS core network. The two other network entities (the second and third network entities) are peers, and one of them is performing as the serving network entity. Term serving network entity refers to a situation, where there are two peer network entities transmitting the data packets related to this certain connection. The other network entity, which controls the transmission of packet and, for example, the use of transmission resources, is called the serving network entity. The other peer network entity, which is similar to its peer, basically relays the user data and signaling data. The serving network entity and its peer may be, for example, radio network controllers of a radio access network.

In the method according to the invention, the need for the relocation of a serving network entity is communicated by the serving network entity to its peer network entity using a path that does not include the first network entity. Because the second and third network entities can act as serving network entities, they have the information needed, for example, to control the transmission of the packet data and the transmission resources. They can also detect the need for the relocation of a serving network entity. There is thus no need for entities from other hierarchical levels (i.e. non-peer entities) to be involved in the beginning of the serving network entity relocation. The path connecting the peer network elements may comprise, for example, routers. This is typically the case when the peer network elements are connected to each other using a packet data network. Term path refers here to a path, for example formed by cables and routers, connecting the endpoints and including the endpoints (network entities). Term separate paths refers here to a situation, where none of the paths forms a part of other path. The paths may, however, have common parts. For example, two paths may involve certain same routers as long as at least one of the endpoints is different.

Once the role of the serving network entity is changed to the third network entity, for example to a target radio network controller, there is no need to keep the second network entity involved in the packet data transmission. Either of the peer network entities may inform the first network entity that the path of the packet data transmission should be changed. This is further discussed in conjunction with the preferred embodiments of the invention.

One of the advantages of the invention is that the peer network entities, for example in the radio access network, can prepare the relocation of a serving network entity. This way the other network entities, for example entities in a core network, need not consume resources for actions that are carried out between the peer entities. A further advantage is that the possible error situations are easier to handle: if there are only to entities involved in certain steps of a procedure, it is easier to determine the cause, for example, for a missing protocol message. Further, the response for a request to perform a relocation of a serving network entity is received quickly.

The method according to the invention is especially suitable for network entities that are connected to each other using a packet switched network. In these networks it is not necessary to establish a connection before sending signaling messages or user data. In conjunction with the preferred embodiments, the situation where signaling is performed using point-to-point connections is discussed.

The appended dependent claims describe some preferred embodiments of the invention.

BRIEF DESCRIPTION OF THE DRAWINGS

The invention will now be described more in detail with reference to the preferred embodiments by the way of example and to the accompanying drawings where.

Above in connection with the description of the prior art, reference was made to FIGS. 1–3. The same reference numerals are used for corresponding parts in the remaining figures.

BEST MODE FOR CARRYING OUT THE INVENTION

Figure 4:
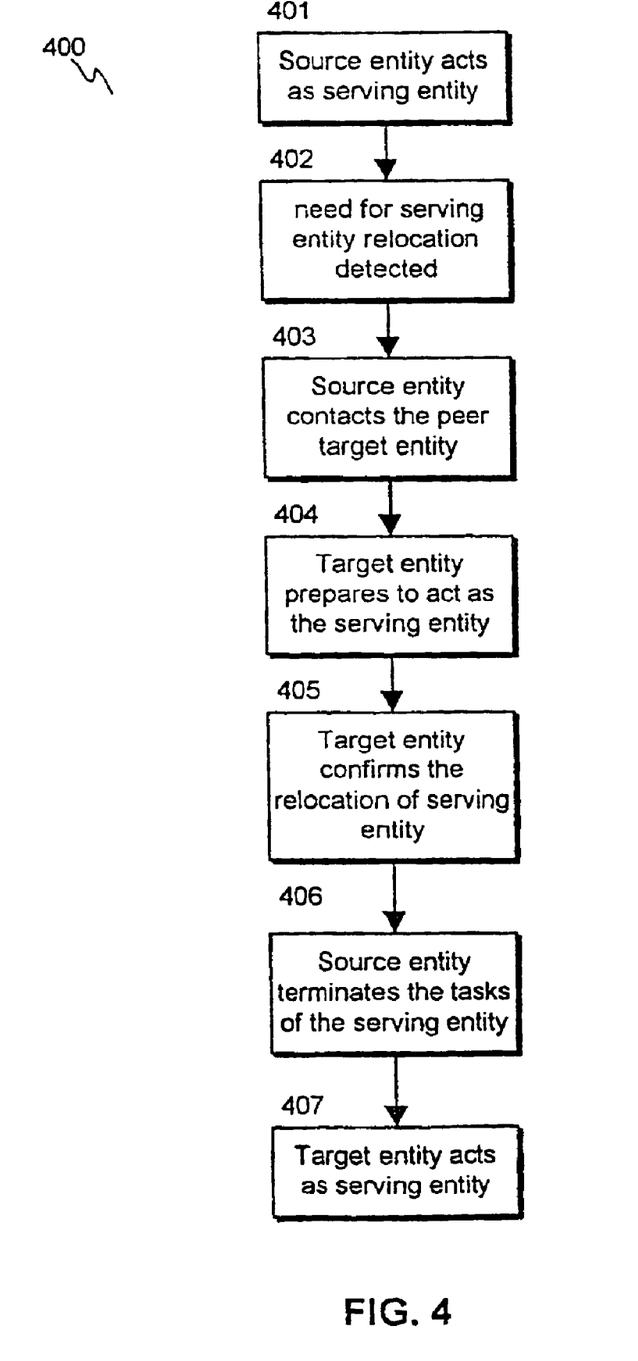
FIG. 4 illustrates a flowchart of a method for relocating a serving network entity according to a first preferred embodiment of the invention.

FIG. 4 presents a flowchart of a method 400 for relocating a serving network entity according to a first preferred embodiment of the invention. In the beginning of the method, the source network entity acts as the serving network entity (step 401). It detects the need for relocation (step 402) and contacts the peer network entity, which is the target of the relocation (step 403). The target entity prepares to act as a serving network entity (step 404). Here it may need information about the packet data connection and this information can be transmitted in step 403.

Once the target network entity has completed the preparations, it sends a confirmation message (step 405) to the source entity. If the target network entity cannot act as a serving network entity, it may communicate the refusal to the source network entity. In this case, the target network entity may try to find another peer network entity that can act as the serving network entity.

After receiving a confirmation message, the source network entity sends to the target network entity a message indicating that from the receipt of the message the target network entity is responsible for acting as the serving network entity, and simultaneously, it stops acting as the serving network entity (step 406). After the relocation, the target network entity is the serving network entity (step 407).

Figure 5:
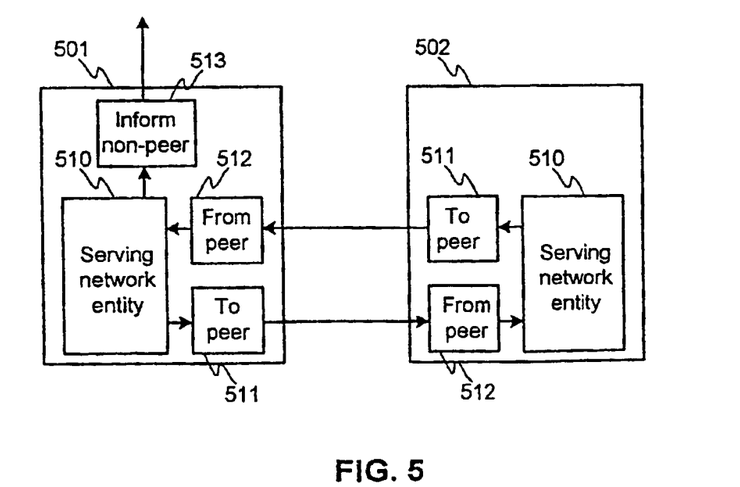
FIG. 5 illustrates network elements according to the invention.

FIG. 5 shows two peer network entities 501, 502 according to the invention. Each of these network entities is able to act as a serving network entity. This is represented in FIG. 5 with the block 510. The capability to act as a serving network entity comprises the capability of detecting the need for relocation of the serving entity and constructing a message (including necessary information about the packet data connection and quality of service requirements, for example) indicating this need. The network entities 501, 502 according to the invention comprise a block 511 which is responsible for sending the message to a peer network element. They also comprise a block 512 which is used to receive the message indicating the need for relocation from a peer network element.

In FIG. 5 the network entity 501 comprises also a block 513 using which a non-peer network entity is notified of the change of peer network entity address. This notification may comprise, for example, a new network address where the non-peer network entity should after the receipt of the message send data packets related to a certain packet data connections, a new Tunnel End Point Identifier which the non-peer network entity should after the receipt of the message add to every data packet related to a certain packet data connections. The usage of the modify tunnel message to change the destination address from a peer network entity to another is new (previously, this message was only planned to change the connection from one computer unit to another within the same entity). In one alternative embodiment, the peer network entity also provides to the non-peer network entity a notification comprising a new network address where the non-peer network entity should after the receipt of the message send signaling message related to a certain packet data connection or to a certain Mobile Station.

The blocks 511 and 512 are most probably part of a certain protocol. If the network entities 501, 502 according to the invention are, for example, radio network controllers of a radio access network of the UMTS cellular system, the protocol may be the RNSAP (Radio Network Subsystem Application Part), and, the block 513 may be part of the RANAP (Radio Access Network Application Part) protocol. And the procedure used to modify the tunnel between a RNC and a SGSN may be the RAB (Radio Access Bearer) Assignment procedure.

Figure 6:
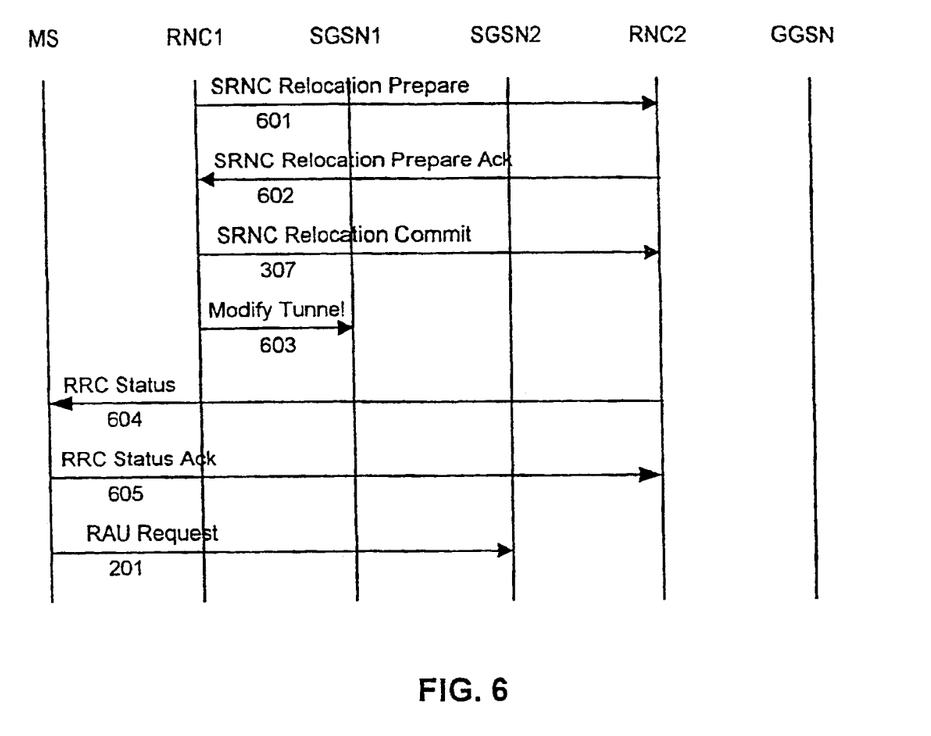
FIG. 6 illustrates a message sequence chart of a relocation of a serving radio network controller according to a second preferred embodiment of the invention.
Figure 8A:
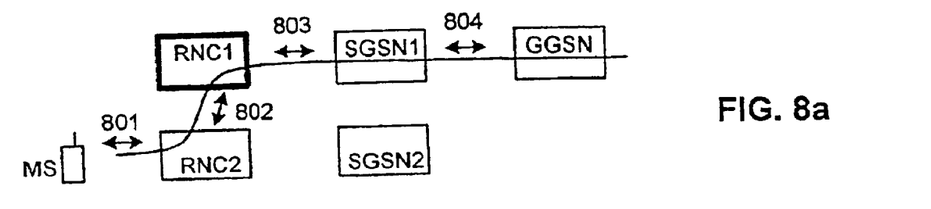
FIG. 8a shows the RNC 2 of FIG. 1 acting as a drift RNC while the RNC 1 is acting as a serving RNC with the bidirectional routing of packets shown by the arrows.

FIG. 6 shows a message sequence chart of a method for relocating a serving RNC related to a certain mobile station according to a second preferred embodiment of the invention. In the beginning of this method, there is a serving RNC and a drift RNC involved in the packet data transfer related to a certain mobile station. The route of data packet between the mobile station and, say, and GGSN is (using the example presented in FIG. 1) MS-BS2-RNC2-RNC1-SGSN1-GGSN. This is also presented in FIG. 8a, where the arrows 801, 802, 803, 804 refer to bidirectional information transmissions between the network elements. The source RNC and the mobile-station are the endpoints of the packet data transmission 802, 801 in the radio access network.

In this method the source RNC detects the need to perform a Serving RNC relocation and determines the target RNC. It knows, for example, the network address where to send signaling messages intended for this target RNC and it sends a SRNC Relocation Prepare message 601 to the target RNC. The message indicates, for example, the IMSI of the mobile station, a network address for sending uplink packets (for example, the address of the source SGSN), SGSN Tunnel Endpoint Identifier (TEID), and Quality of Service profile of the MS. In a first alternative embodiment, the network address to be used for uplink signaling is also sent in this message.

After receiving the SRNC Relocation Prepare message 601, the target RNC prepares itself to receive downlink packets intended for the mobile station and, consequently, establishes a context for this mobile station and selects RNC TEID and the RNC network address for these downlink packets. The IMSI of the mobile station and the Quality of Service profile are needed in this preparation. Thereafter the target RNC sends a SRNC Relocation Prepare Acknowledgement message 602 to the source RNC. This message indicates, for example, the network address, where the source RNC can forward downlink data packets intended for the mobile station and possibly the RNC TEID established for these packets. In a second alternative embodiment, the network address to be used for downlink signaling is also sent in this message. But the source RNC is still acting as the Serving RNC and the data transmission is not modified until a SRNC Relocation Commit message is sent.

The source RNC sends the SRNC Relocation Commit message 307 which includes all necessary radio parameters and PDCP (Packet Data Convergence Protocol) parameters needed by the target RNC to start the control of the radio connections, in other words, the target RNC becomes the serving RNC. At this point the source RNC stops downlink transmission to the mobile station through the path 802 and forwards the downlink packets intended for the mobile stations to the target RNC using the path 822, as presented in FIG. 8b. The protocol used for the transmission presented by arrow 822 may be GTP-U (GPRS Tunneling Protocol for the User plane), and it is different from the protocol for the transmission presented by arrow 802. The downlink packets using the path 822 are sent to the network address comprised in the SRNC Prepare Acknowledgement message 602 and the packets include the RNC TEID comprised in that message.

Figure 8B:
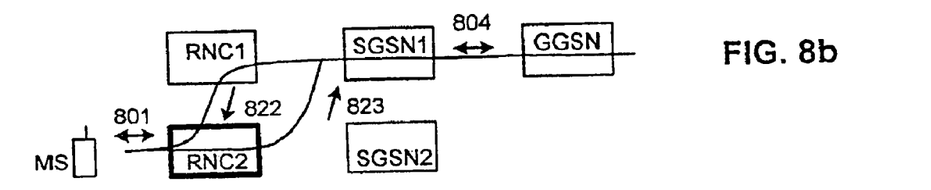
FIG. 8b shows the RNC 1 of FIG. 8a stopping its transmission of downlink packets to the mobile station after sending the SRNC relocation commit signal 307 of FIG. 6 to RNC 2 and thereafter sending downlink packets to RNC 2 as indicated by an arrow 822.

If the SRNC Relocation Prepare message 601 also comprises a network address where to forward uplink packets and a SGSN TEID for the packets, the target RNC may after receiving the SRNC Relocation Commit message 307, forward the uplink packets sent by the mobile station directly to the source SGSM (see arrow 823 in FIG. 8b). The SGSM typically does not check the address of the sender of packets, so it does not necessarily even notice that the sender of the packets is the target RNC instead of the source RNC.

Figure 8C:
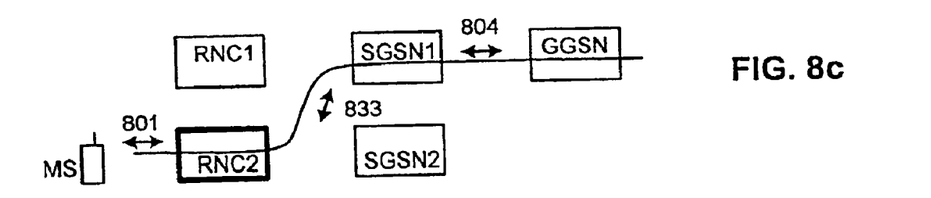
FIG. 8c shows relocation of the RNC 2 as the serving RNC after the source SGSN 1 modifies the tunnel between itself and an RNC, i.e., by including in its context the new RNC TEID and the new RNC network address, the route of the data packets after the relocation being shown by bidirectional arrows.

To change the route for the downlink packets, the source RNC sends a Modify Tunnel message 603 to the source SGSN. This message is an optional message and it can, for example, also inform the source SGSN that a serving RNC relocation has taken place. The message indicates, for example, the network address of the target RNC and possibly the RNC TEID related to the downlink packets. This information is typically provided to the source RNC in the SRNC Relocation Prepare Acknowledgement message 602. An alternative is that the target RNC, which is currently the serving RNC, informs the source SGSN of the SRNC relocation and/or change of paths for example by sending a Modify Tunnel message. The necessary information can be provided to the target RNC by the source RNC, for example, in the SRNC Prepare message 601. In an alternative embodiment, the target RNC may also inform of the new downlink address for signaling information, and establish the new signaling connection. This information may be sent using a new message to modify signaling link. After the source SGSN modifies the tunnel between itself and an RNC, i.e. includes in its context the new RNC TEID and the new RNC network address, the route of the data packets is such as presented in FIG. 8c with arrows 801, 833 and 804. The data transmission 804 between the SGSN and the GGSN is not affected by the mere relocation of the serving RNC.

The target RNC, after taking the role of the serving RNC, sends to the mobile station a RRC Status message 604. This message carries a Routing Area Identifier corresponding to the target routing area. The mobile station verifies the receipt of the RRC Status message with RRC Status Ack message 605. Alternatively, the MM system information messages can be exchanged between the mobile station and the target RNC, similarly as Presented in FIG. 3. If the source RNC and the target RNC belong to the same routing area, the rest of the relocation SRNC procedure is related to the signaling link: the signaling link between the source RNC and the source SGSN is torn down and a signaling link between the target RNC and the source SGSN is established. Signaling can be supported either by a packet switched network (for example, an IP network) or with point-to-point connections (such as the Broadband Signalling System 7). In each case the updating of signaling links is straightforward. In the said second alternative embodiment, where the SRNC Relocation Prepare Ack message 602 comprises an address for the downlink signaling, the signaling link can be modified by the source RNC, by indicating the new network address where SGSN should after the modification procedure send signaling messages related to a certain packet data connection or to a certain Mobile Station. In the said first alternative embodiment, where the SRNC Relocation Prepare message 601 comprises an address for the uplink signaling, the signaling link can be modified by the target RNC, by indicating the new network address where SGSN should after the modification procedure send signaling messages related to a certain packet data connection or to a certain mobile station.

If the mobile station notices that the RAI in the RRC Status message is different from the present RAI, it starts the Routing Area Update procedure with the Routing Area Update Request message 201. When the signaling is done using point-to-point connections and the Serving RNC relocation procedure is an inter-SGSN SRNC relocation procedure, the source SGSN cannot exchange signaling messages with the target RNC. In this case, the source RNC may, for example, set the state of the Iu signaling connection of this mobile station to a signaling-suspended due to SRNC relocation state. If the source SGSN sends signaling messages to the source RNC, it may return an error message indicating the suspended state. The source SGSN may then also enter a signaling-suspended state for the Iu signaling connection of this mobile station. In this case, the mobile station originating signaling messages are sent from the target RNC to the target SGSN. Messages not related to RAU may be ignored until the RAU procedure is complete.

If the signaling connections are supported by a packet switched network, it is also possible to have a signaling link between the target RNC and the source SGSN. The user data packets are transmitted between them, and they may also exchange signaling messages also in the inter-SGSN Serving RNC relocation procedure.

Figure 7:
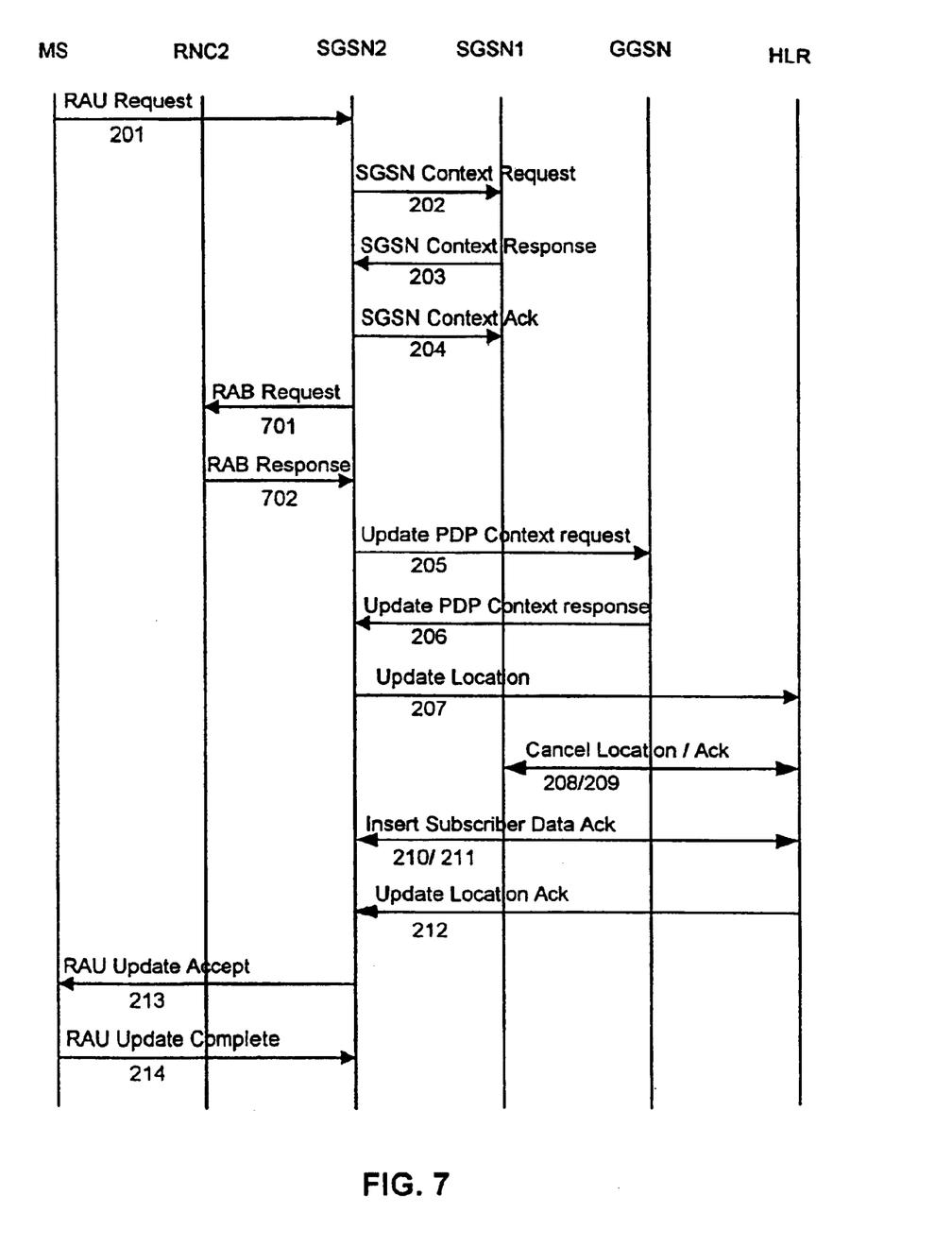
FIG. 7 illustrates a message sequence chart of a routing area update related to the relocation of a serving radio network controller according to the second preferred embodiment of the invention, FIGS. 8a–8e together illustrate the transmission of user data during various phases of the relocation of a serving radio network controller according to the second preferred embodiment of the invention, and in particular, (a)

FIG. 7 presents the message sequence chart of the Routing Area Update procedure that forms the second part of the method for relocating a serving RNC according to the second preferred embodiment of the invention. It starts with the Routing Area Update Request message 201 that the mobile station sends to the target SGSN. Thereafter the target and source SGSNs exchange SGSN Context messages 202, 203 and 204 as explained in context of prior art.

Figure 8D:
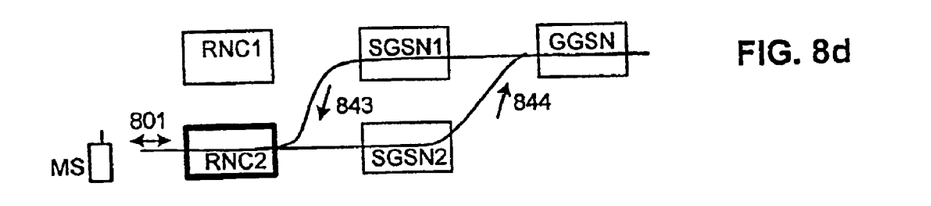
FIG. 8d shows a target RNC (RNC2) starting to send uplink data packets to a target SGSN (SGSN 2) after receiving an RAB request signal on a line 701 in FIG. 7.

The SGSN Context Response message 203 carries information about the PDP context of the mobile station. The target SGSN notices based on this information that a packet data tunnel was active between the target RNC and the source SGSN. The target SGSN aims to transfer the other endpoint of this tunnel from the source SGSN to itself. Therefore it sends a RAB Establishment Request message 701, which indicates the SGSN TEID, the new address for sending uplink data packets and Quality of Service parameters, to the target RNC. The target RNC notices that it already has a RNC TEID in use for this data transmission of this user, and updates the uplink network address and the SGSN TEID. Thereafter it sends a RAB Establishment Response message 702 to the target SGSN. This message indicates the proper address for downlink data packets, RNC TEID and Quality of Service parameters. The target RNC may immediately start to send uplink data packets to the target SGSN, which in turn forwards them to the GGSN (see arrow 844 in FIG. 8d). The GGSN typically does not check the sender of packets, and thus is does not mind the uplink packet being sent by the target SGSN instead of the source SGSN.

Figure 8E:
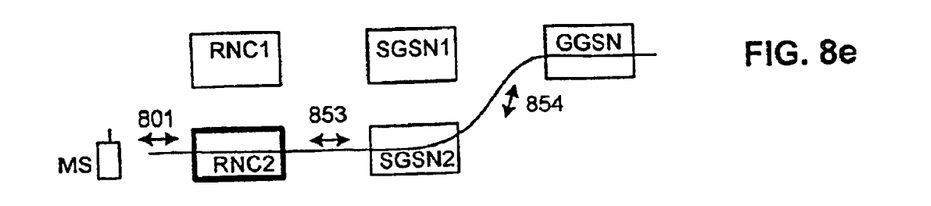
FIG. 8e shows the downlink packets of FIG. 8d now being sent via the target SGSN (SGSN 2) to the target RNC (RNC 2), in contrast to the downlink packets of FIG. 8d before the GGSN has updated the PDP context related to this packet data connection.

Thereafter the RAU procedure in FIG. 7 continues as the RAU procedure described in connection with the prior art. After the GGSN has updated the PDP context related to this packet data connection, it can send downlink data packets directly to the target SGSN (arrow 854 in FIG. 8e).

The SRNC Relocation Commit message 307, the Modify Tunnel message 603 and the RAB Establishment Request/ Response 701, 702 are existing messages in the RANAP (Radio Access Network Application Part) protocol. The Modify Tunnel message is currently seen to be used by an RNC to, for example, change computer unit handling a certain packet data connection. A RAB Assignment procedure is used to modify or release an already established RAB or to establish a new RAB. For clarity, when this procedure is used to establish a new RAB, we named it in this description a RAB establishment message/procedure, and when this procedure is used to modify a RAB, the message is called a Modify Tunnel message. On the Iu interface between a SGSN and a RNC, a certain GTP tunnel corresponds to a RAB in the radio access network, and this GTP tunnel can be modified with the Modify Tunnel message (whose exact standard name is RAB Assignment Request message). The RRC Status and RRC Status Ack are also existing messages of the RRC protocol.

Figure 9:
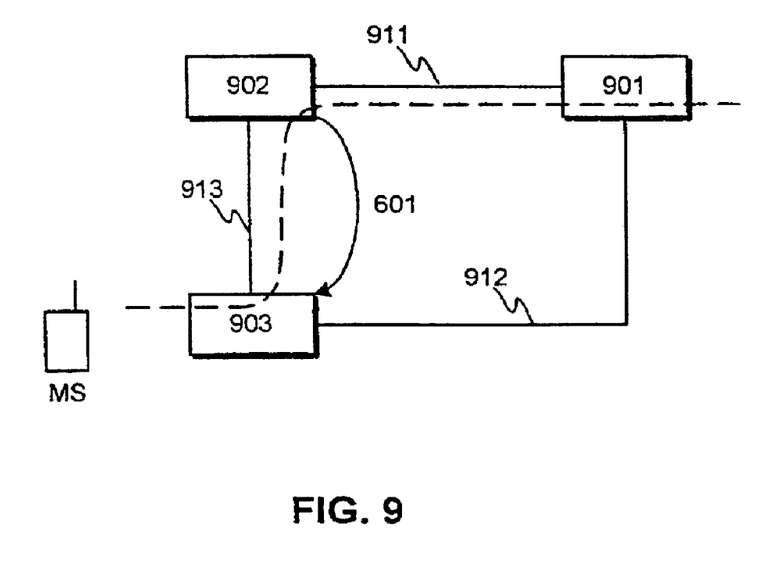
FIG. 9 is a schematic drawing illustrating the method according to the invention.

FIG. 9 presents a drawing that illustrates further the method according to the invention. Before the relocation of the serving network entity, packet data information is transmitted between a terminal and a first network entity (901) at least via a second network entity (902) and via a third network entity (903). The first network entity (901) is connected to the second network entity (902) with a first path (911) and to a third network entity (903) with a second path (912). The third network entity is a peer network entity of the second network entity, and it is connected to the second network entity with a third path (913). The first, second and third paths are separate paths.

The second network entity acts before the relocation as the serving network entity. In a method according to the invention, the need for relocation of the serving network entity is communicated (601) to the third network entity by the peer second network entity using the third path. The relocation prepare message, for example, is not transmitted via the first network element. After the relocation said packet data information between the terminal and the first network element is transmitted via the third network entity.

The RNC and SGSN of the UMTS system are used here as examples of a network and examples of network entities where the invention can be applied. The method and network entities according to the invention can also be applied in other networks, especially in other cellular networks, and between other network elements.

In view of the foregoing description it will be evident to a person skilled in the art that various modifications may be made within the scope of the invention. While preferred embodiments of the invention have been described in detail, it should be apparent that many modifications and variations thereto are possible, all of which fall within the scope of the invention.

What is claimed is:

1. A method for relocating a serving network entity related to a certain terminal, comprising the steps of:
   before relocation transmitting certain packet data information between the terminal and a first network entity at least via a second network entity, which is connected to the first network entity with a first path, and via a third network entity, which is connected to the first network entity with a second path and to the second network entity, which is a peer entity of the third network entity, with a third path, which first, second and third paths are separate paths,
   before the relocation the second network entity is acting as the serving network entity,
   after the relocation transmitting said information via the third network entity, which is acting as the serving network entity, and
   a need for serving network entity relocation from the second network entity to the third network entity is detected,
   wherein the need for relocation is communicated to the third network entity by the second network entity using the third path, and a routing area update procedure is triggering the relocating wherein the terminal is a mobile station, the second network entity and third network entity are entities of a radio access network of a cellular system and the first network entity is a network entity of a core packet network of the cellular system.

2. A method according to claim 1, further comprising the steps of:
    sending a first message indicating the need for relocation of a serving network entity by the second network entity to the third network entity using the third path and
    sending a second message indicating a capability to act as a serving network entity from the third network entity to the second network entity.

3. A method according to claim 2, further comprising the step of transmitting information in the first message enabling transmission of uplink information from the terminal to the first network element using the second path.

4. A method according to claim 3, further comprising the step of transmitting information in the first message enabling the transmission of user data.

5. A method according to claim 3, further comprising the step of transmitting information in the first message enabling the transmission of signaling data.

6. A method according to claim 2, further comprising the steps of:
    sending a third message indicating the relocation of a serving network entity to the third network entity from the second network entity using the third path and
    onwards from a certain first time, which is after receipt of the third message, carrying out tasks of the serving entity by the third network entity.

7. A method according to claim 6, further comprising the step of communicating at a certain second time after the first time, certain information to the first network entity.

8. A method according to claim 7, wherein at or after the second time the method further comprises the step of communicating to the first network entity by the second network entity a change of path from said first path to said second path for downlink information from the first network entity to the terminal.

9. A method according to claim 7, wherein at or after the second time the method further comprises the step of communicating to the first network entity by the third network entity a change of path from said first path to said second path for downlink information from the first network entity to the terminal.

10. A method according to claim 7, further comprising the step of changing the path of signaling information from the first path to the second path and wherein the changing is initiated by the second network entity or the third network entity.

11. A method according to claim 7, wherein onwards from a certain third time after the second time and at least during a certain time interval, said method further comprises the step of transmitting said information between the third network entity and the first network entity using the second path.

12. A method according to claim 11, wherein
    downlink information is transmitted to the terminal and uplink information is transmitted by the terminal and during a certain time interval between the first time and the third time, said method further comprises the steps of transmitting said downlink information from the first network entity to the third network entity using the first path and the third path and transmitting said uplink information from the third network entity to the first network entity using the second path.

13. A method according to claim 11, wherein at a certain fourth time after the second time, communicating to the terminal a routing area which is handled by the third network entity and to which the terminal belongs.

14. A method according to claim 13, wherein
    a first routing area, which is handled by the third network entity, is different from a second routing area, which is handled by the second network entity, and wherein said method further comprises the step of sending
    a fourth message from the terminal to a fourth network entity, which is a peer network entity of the first network entity, that said terminal belongs to the first routing area, and is connected to the first network entity with a fourth path and to the third network entity with a fifth path, which said fourth path and fifth path are separate from the first path, the second path and the third path.

15. A method according to claim 14, further comprising the steps of
    sending to the third network entity a fifth message indicating that said information is to be transmitted to the fourth network entity instead of the first network entity and
    onwards from a certain fifth time, which is after the receipt of the fifth message, transmitting said information between the third network entity and the fourth network entity using the fifth path.

16. A method according to claim 15, further comprising the steps of:
    before the receipt of a fifth message, transmitting said information further between the first network entity and a fifth network entity, which is connected to the first network entity with a sixth path and to the fourth network entity using a seventh path,
    sending to the fifth network entity a sixth message indicating said information is to be transmitted between the fourth network entity and the fifth network entity using the seventh path and
    during a certain time interval after the receipt of the fifth message, transmitting said uplink information from the third network entity to the fifth network entity using the second path and the sixth path and transmitting said downlink information from said fifth network entity to the third network entity using the seventh path and the fifth path.

17. A method according to claim 1, wherein the second and third network entities are radio network controllers of the UMTS cellular system and the first network entity is a Serving GPRS Supporting Node of the UMTS cellular system.

18. A network entity of a radio access network of a cellular system, which is arranged to perform a role of a serving network entity, comprising:
    means for detecting a need for relocation of the serving network entity;
    means for sending a message indicating a need for a relocation of said serving network entity to a peer network entity; and
    means for triggering the relocation in accordance with a routing area update procedure,
    said network entity is arranged to perform a role of a non-serving network entity, further comprising means for receiving, when in said role of a non-serving network entity, a peer network entity message indicating a serving network entity need for a relocation.

19. A network entity according to claim 18, further comprising means for informing a network element that said relocation of said serving network entity has taken place.

20. A network entity according to claim 18, further comprising means for constructing a message.

21. A network entity according to claim 20, comprising a radio network controller of the UMTS radio access network.

22. System (501, 502), comprising:
   at least two network entities of a radio access network with each network entity arranged to perform a role of a serving network entity comprising:
   means for detecting a need for relocation of the serving network entity;
   means for sending a message indicating a need for a relocation of a serving network entity; and
   means for triggering the relocation in accordance with a routing area update procedure; and with each network entity also arranged to perform a role of a non-serving network entity, further comprising means for receiving, when in said role of a non-serving network entity, a peer network entity message indicating a serving network entity need for a relocation.

23. The system of claim 22, wherein each of said at least two network entities further comprises means for informing a network element that said relocation of said serving network entity has taken place.

24. The system of claim 22, wherein each of said at least two network entities further comprises means for constructing a message.

25. The system of claim 24, wherein each of said at least two network entities comprises a radio network controller of a UMTS radio access network.

\* \* \* \* \*